April 28, 1936.  H. P. CLAUSEN  2,038,647
SIGNALING SYSTEM
Filed Sept. 14, 1934
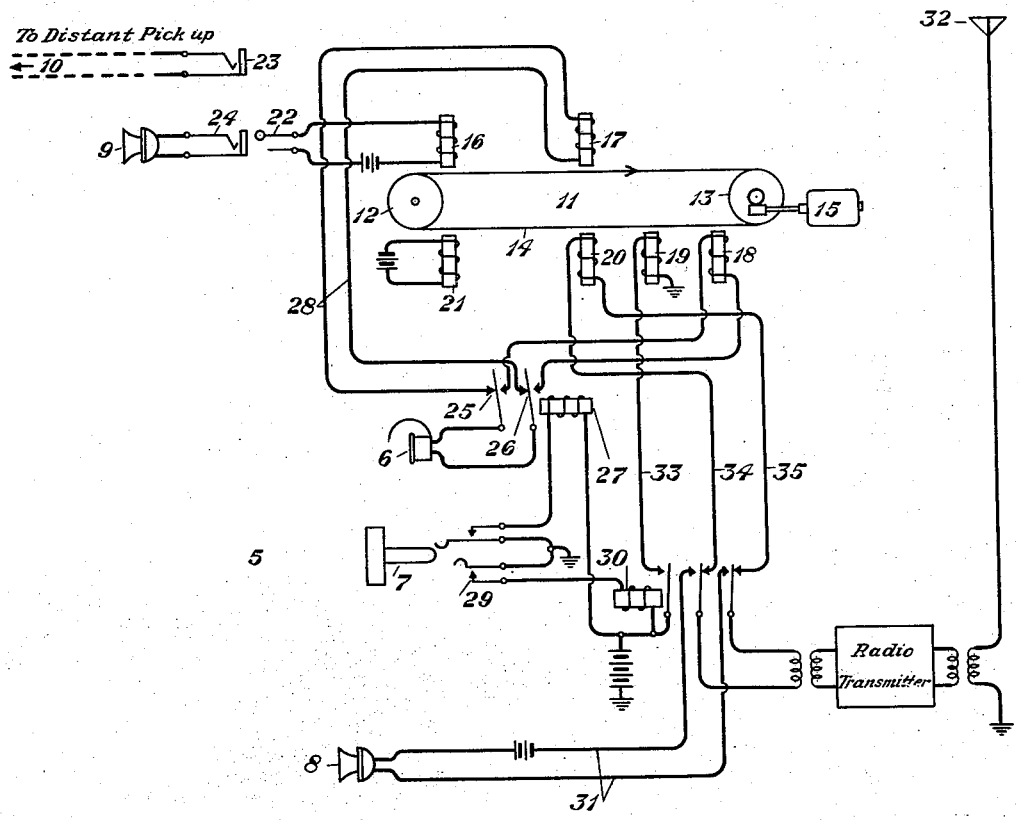
INVENTOR
H.P. Clausen
BY
ATTORNEY Patented Apr. 28, 1936

2,038,647

UNITED STATES PATENT OFFICE 2,038,647

SIGNALING SYSTEM

Henry Peter Clausen, White Plains, N. Y., assignor to American Telephone and Telegraph Company, a corporation of New York Application September 14, 1934, Serial No. 744,084

9 Claims. (Cl. 179—100.2)

This invention relates to signaling systems, and more particularly to the control of the transmission of programs including news, music, information, or the like, over a transmitting media such as space, wired circuits, or the like.

In the transmission of programs, public addresses, or the like, or in the transmission of material received over a chain network, on which severe crosstalk from working telephone circuits happens to be superimposed by some accident, it sometimes becomes necessary to eliminate, or to censor, certain portions of the matter to be broadcast. In order that the monitor may have time to supervise the matter to be broadcast it has been found that a delay interval is convenient between the time the matter is received and recorded, and the time it is to be broadcast.

Accordingly, it is an object of this invention to provide an improved system whereby a delay is introduced between the time of recording received matter and the broadcasting thereof, to provide sufficient time for a monitor to determine whether or not portions of such matter should be eliminated and to provide suitable means whereby such matter may be prevented from being broadcast.

A further object is to provide means whereby other programs, announcements, or the like, may be substituted during the interval of interruption of the original program matter.

These and further objects will be apparent from the following description when considered in connection with the accompanying drawing, in which one embodiment of the invention is diagrammatically represented.

Referring to the drawing, illustrating the improved system, it is shown as having a monitoring station 5 which includes a monitor's receiver 6 and a switch key 7 of a type adapted to be operated to two positions. In the first position the key closes certain contacts, and in the second position additional contacts, as will be presently described.

A monitor's transmitter is shown at 8 and is used to make announcements over a sending circuit when it is desired to interrupt a program, or the like, transmitted through the microphone 9 or incoming from a distant pick-up point 10 of a chain network. A recording and reproducing device is shown at 11 which, in this instance, for the purpose of illustration, is indicated as being of an ordinary telegraphone type. This recording and reproducing device may include the usual pulleys 12 and 13, which are spaced a convenient distance apart, and around which passes an endless band of wire or steel 14, or for example, paramagnetic material. The pulley 13 may be rotated by means of a motor 15, and the band 14 is thus caused to travel in the direction indicated by the arrow. A recording element or magnet is shown at 16 which is controlled by voice or other undulating currents transmitted from the microphone 9, or from the distant pick-up point 10. The monitor's receiver 6 is connected to a pick-up magnet 17 so that the material recorded by the magnet 16 is heard in the monitor's receiver when the record on the traveling band 14 reaches the magnet 17. A second pick-up point is provided by the magnet 18, whereby the monitor may again observe the record being transmitted if this is desired. A magnet 19, adjacent the second pick-up point, functions as a special wipe-out and is operated by the monitor when it is desired to erase or wipe out an unwanted portion of the program material or the like transmitted by the record on the traveling wire 14, and thus prevent its transmission over a sending circuit to be later described. A second pick-up magnet is shown at 20 which may be connected to the sending circuit over conductors 34 and 35 and thence through a radio transmitter and over the antenna circuit 32. In addition, a normal wipe-out point is provided by the magnet 21 whereby the record upon the traveling band 14 may be entirely and permanently erased if desired.

In the operation of the system it will be assumed that the recording and reproducing element 11 is such as to charge the traveling band 14 which travels over the pulleys 12 and 13, with the program matter to be recorded and reproduced. The plug 22 will be inserted in either the jack 23 to obtain material to be broadcast from a distant chain network 10, or the jack 24 to obtain materal from a local microphone 9. The magnet 16 will be energized by the voice or other currents incoming from the source 9 or 10, and a record will be made upon the traveling band 14 in a well understood manner. When the band reaches the pick-up magnet 17, the material recorded on said band will be transmitted to the monitor's receiver 6, over a circuit extending from said receiver, contacts 25 and 26 of relay 27, conductors 28, and the winding of magnet 17. The monitor is thus apprised by the receiver 6 of the program matter being transmitted. Should the monitor desire to delete a portion of the program matter, which is recorded on the traveling band 14, the key 7 is actuated to its first position, thereby closing a circuit from ground, contacts of key 7, winding of relay 27, to battery. The closure of this circuit causes the energization of relay 27 which transfers the connection, formerly outlined for the monitor's receiver, from the normal contacts 25 and 26 of relay 27, to its make contacts, thus completing a circuit from the monitor's receiver 6, through said make contacts of relay 27, and winding of magnet 18. A delay interval is introduced by the travel of the band 14 between the first pick-up point at magnet 17, and the second pick-up point at magnet 18, so that the monitor has time to prepare and act upon the recorded matter when it reaches the second pick-up point at magnet 18 if this is desired. When such unwanted portion of the record reaches the second pick-up point, the monitor actuates the key 7 to its second position, thereby completing an additional circuit. This additional circuit extends from ground, contact 29, winding of relay 30, to battery, thus energizing relay 30. The operation of relay 30 closes a circuit through its make contacts, from the transmitter 8, over the conductors 31 and thence over the radio transmitting equipment and over the antenna circuit 32. The operation of relay 30 also closes a circuit through its inner make contact from ground, winding of wipe-out magnet 19, conductor 33, to battery, thus causing the operation of the wipe-out magnet 19. This wipe-out magnet upon operation effaces the unwanted program matter from the record when the traveling band passes this point.

In the normal course of transmitting programs, or like matter, over the sending circuit, the band 14 would be permitted to continue its travel to the pick-up magnet 20 at which point the matter recorded on the band would be transmitted over conductors 34 and 35, and through the normal contacts of relay 30, radio transmitter equipment and the antenna circuit 32. The operation of relay 30 under the wipe-out conditions previously outlined, will transfer this transmitting circuit from the normal contacts of relay 30 to its make contacts so that transmission may then take place from the transmitter 8 over conductors 31, if desired, instead of from the normal pick-up point at magnet 20.

The monitor's receiver 6, during the transfer of the sending circuit from the pick-up point 20 to the transmitter 8, as just outlined, will be connected to the second pick-up point at magnet 18. When the traveling band 14 has advanced beyond the point upon which the unwanted portion of the program matter, and no other undesirable program matter appears, the key 7 may then be released. This will cause the deenergization of relays 27 and 30 and restore the circuit to normal, so that the monitor's receiver 6 will be connected to the pick-up point at magnet 17, as originally described.

What is claimed is:

1. In a signaling system, a continuously operated program source, a circuit for simultaneously sending programs obtained from said source to a receiving point, means to continuously introduce a delay of a predetermined interval in the transfer of a program from said source to said receiving point, and means operable during said delay to eliminate an undesired portion of the program before it arrives at said receiving point.

2. In a signaling system, a continuously operated program source, means to simultaneously record programs from said source, a circuit for continuously sending programs obtained from said record, said sending circuit being so associated with said recording means that it will pick up an element of a program therefrom after a pretermined time interval following the recording of such program element, and means operable during said interval to prevent the sending circuit from picking up an undesired portion of the program.

3. In a signaling system, a continuously operated program source, a circuit for simultaneously sending programs obtained from said source, means to continuously introduce a delay of a predetermined interval in the transfer of a program from said source to said sending circuit, means operable during said delay to eliminate an undesired portion of the program before it arrives at said sending circuit, means to render the sending circuit unresponsive to the program during the period represented by the eliminated portion of the program, and means to enable an attendant to make announcements over said sending circuit while it is unresponsive to the program.

4. In a signaling system, a continuously operated program source, means for simultaneously recording the program on a continuously moving medium, a circuit for sending programs obtained from said medium, means to introduce a delay of a predetermined interval in the transfer to said sending circuit of a program recorded upon said medium, and means operable during said delay to eliminate an undesired portion of the program before it arrives at said sending circuit.

5. In a signaling system, a continuously operated program source, means to simultaneously record programs from said source, means for continuously picking up the program from a point in the record representing a predetermined time delay interval with respect to the part of the program which is being recorded at any instant, a circuit for continuously sending programs picked up from said record, and means operable during said time interval to prevent the picking up of an undesired portion of the program.

6. In a signaling system, a continuously operated program source, means to simultaneously record programs from said source including a continuously moving medium on which a record may be made, means to associate the program source with one point in the path of the moving recording medium, a circuit for continuously sending programs obtained from said record, means to associate the sending circuit with a pick-up point in the path of said recording medium so that a predetermined time interval is introduced between the two points, and means intermediate said points to enable a monitor to erase an unwanted portion of the record before it arrives at the sending circuit point.

7. In a signaling system, a continuously operated program source, means to simultaneously record programs from said source including a continuously moving medium on which a record may be made, means to associate the program source with one point in the path of the moving recording medium, a circuit for continuously sending programs obtained from said record, means to associate the sending circuit with a pick-up point in the path of said recording medium so that a predetermined time interval is introduced between the two points, said record having two monitoring points, one point being shortly after the point where the program is recorded and the other point being shortly before said pick-up point, and a wipe-out mechanism adjacent said second monitoring point whereby after hearing an unwanted portion of the program at the first mentioned monitoring point the monitor can again observe said unwanted portion as it approaches the wipe-out point and if desired operate the wipe-out mechanism.

8. In a signaling system, a continuously operated program source, means to simultaneously record programs from said source including a continuously moving medium on which a record may be made, means to continuously associate the program source with one point in the path of the moving recording medium, a circuit for continuously sending programs obtained from said record, means to associate the sending circuit with a pick-up point in the path of said recording medium so that a predetermined time interval is introduced between the two points, said record having two monitoring points, one point being shortly after the point where the program is recorded and the other point being shortly before said pick-up point, a wipe-out mechanism adjacent said second monitoring point, whereby after hearing an unwanted portion of the program at the first mentioned monitoring point the monitor can again observe said unwanted portion as it approaches the wipe-out point and if desired operate the wipe-out mechanism, and means operable during the wipe-out operation to prevent the sending circuit picking up the unwanted portion of the program.

9. In a signaling system, a continuously operated program source, means to simultaneously record programs from said source including a continuously moving medium on which a record may be made, means to continuously associate the program source with one point in the path of the moving recording medium, a circuit for continuously sending programs obtained from said record, means to associate the sending circuit with a pick-up point in the path of said recording medium so that a predetermined time interval is introduced between the two points, said record having two monitoring points, one point being shortly after the point where the program is recorded and the other point being shortly before said pick-up point, a wipe-out mechanism adjacent said second monitoring point, whereby after hearing an unwanted portion of the program at the first mentioned monitoring point the monitor can again observe said unwanted portion as it approaches the wipe-out point and if desired operate the wipe-out mechanism, means operable during the wipe-out operation to prevent the sending circuit picking up the unwanted portion of the program, and means to enable an attendant to make announcements over said sending circuit while it is unresponsive to the program.

HENRY PETER CLAUSEN.